United States Patent
Papple et al.

(10) Patent No.: US 11,085,644 B2
(45) Date of Patent: Aug. 10, 2021

(54) INTERNALLY COOLED DILUTION HOLE BOSSES FOR GAS TURBINE ENGINE COMBUSTORS

(71) Applicant: PRATT & WHITNEY CANADA CORP., Longueuil (CA)

(72) Inventors: Michael Papple, Verdun (CA); Si-Man Amy Lao, Toronto (CA); Sri Sreekanth, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 38 days.

(21) Appl. No.: 16/508,797

(22) Filed: Jul. 11, 2019

(65) Prior Publication Data

US 2019/0353349 A1 Nov. 21, 2019

Related U.S. Application Data

(63) Continuation of application No. 14/843,197, filed on Sep. 2, 2015, now Pat. No. 10,386,072.

(51) Int. Cl.
*F23R 3/06* (2006.01)
*F23R 3/16* (2006.01)
*F23R 3/00* (2006.01)

(52) U.S. Cl.
CPC .............. *F23R 3/16* (2013.01); *F23R 3/002* (2013.01); *F23R 3/06* (2013.01); *F23R 2900/03042* (2013.01); *F23R 2900/03044* (2013.01); *F23R 2900/03045* (2013.01)

(58) Field of Classification Search
CPC .. F23R 3/002; F23R 3/06; F23R 3/045; F23R 2900/03041; F23R 2900/03044; F23R 2900/03042–03045; F23R 3/04; F23R 3/08
See application file for complete search history.

(56) References Cited

U.S. PATENT DOCUMENTS

| | | | |
|---|---|---|---|
| 7,000,397 B2 | 2/2006 | Pidcock et al. | |
| 8,246,298 B2 | 8/2012 | Wilson | |
| 8,647,053 B2 * | 2/2014 | Hsu | F23R 3/005 |
| | | | 415/115 |
| 8,677,759 B2 | 3/2014 | Kaleeswaran et al. | |
| 8,833,084 B2 | 9/2014 | Carlisle | |
| 2014/0007580 A1 | 1/2014 | Richardson et al. | |
| 2015/0059344 A1 * | 3/2015 | Sandelis | F23R 3/06 |
| | | | 60/722 |
| 2015/0159872 A1 | 6/2015 | Melton et al. | |

FOREIGN PATENT DOCUMENTS

WO WO2014197045 12/2014
WO WO-2015108584 A2 * 7/2015 ............... F23R 3/50

* cited by examiner

*Primary Examiner* — Gerald L Sung
*Assistant Examiner* — Rene D Ford
(74) *Attorney, Agent, or Firm* — Norton Rose Fulbright Canada LLP

(57) ABSTRACT

A cooling arrangement provides cooling around a dilution hole defined in a liner circumscribing a combustion chamber of a gas turbine engine. The cooling arrangement comprises a hollow boss projecting from an outer surface of the liner about the dilution hole. The hollow boss defines an internal cavity extending circumferentially around the dilution hole. The internal cavity has an inlet in fluid flow communication with an air plenum surrounding the liner and an outlet in fluid flow communication with the combustion chamber.

8 Claims, 5 Drawing Sheets

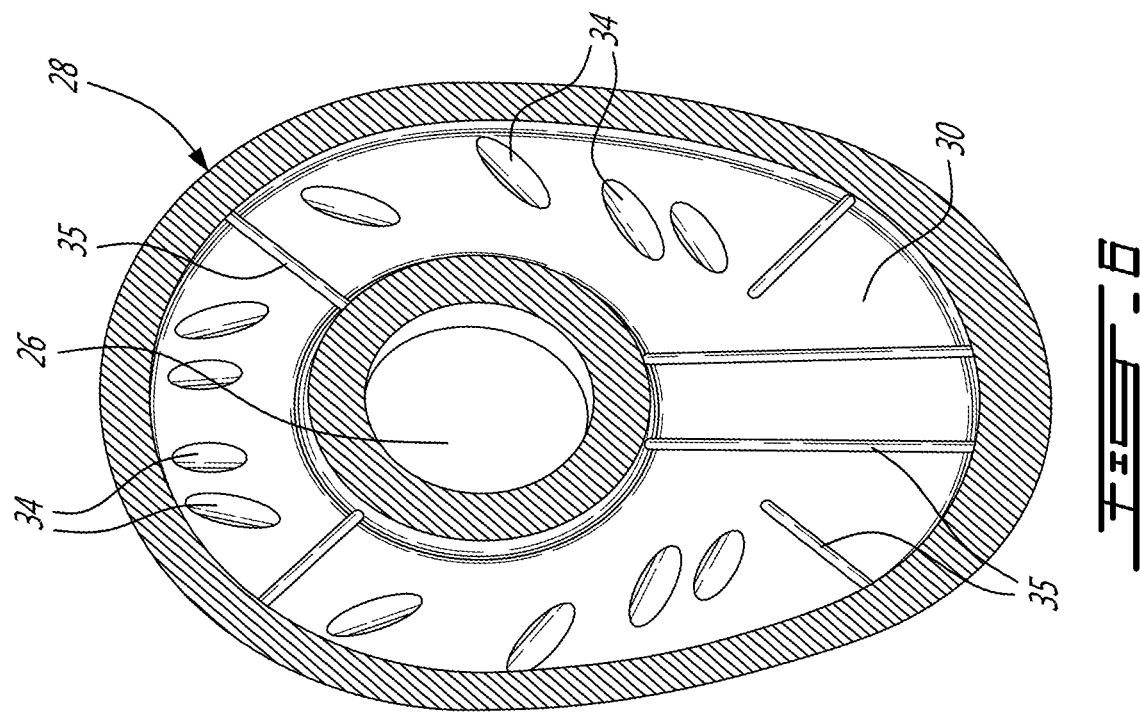
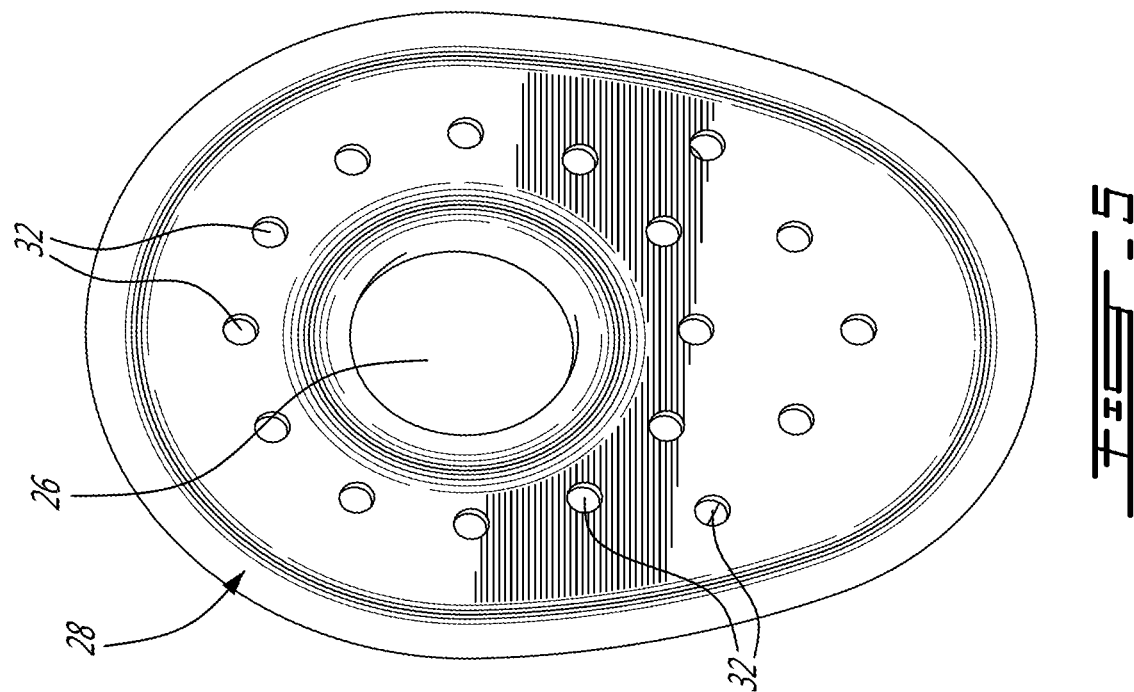

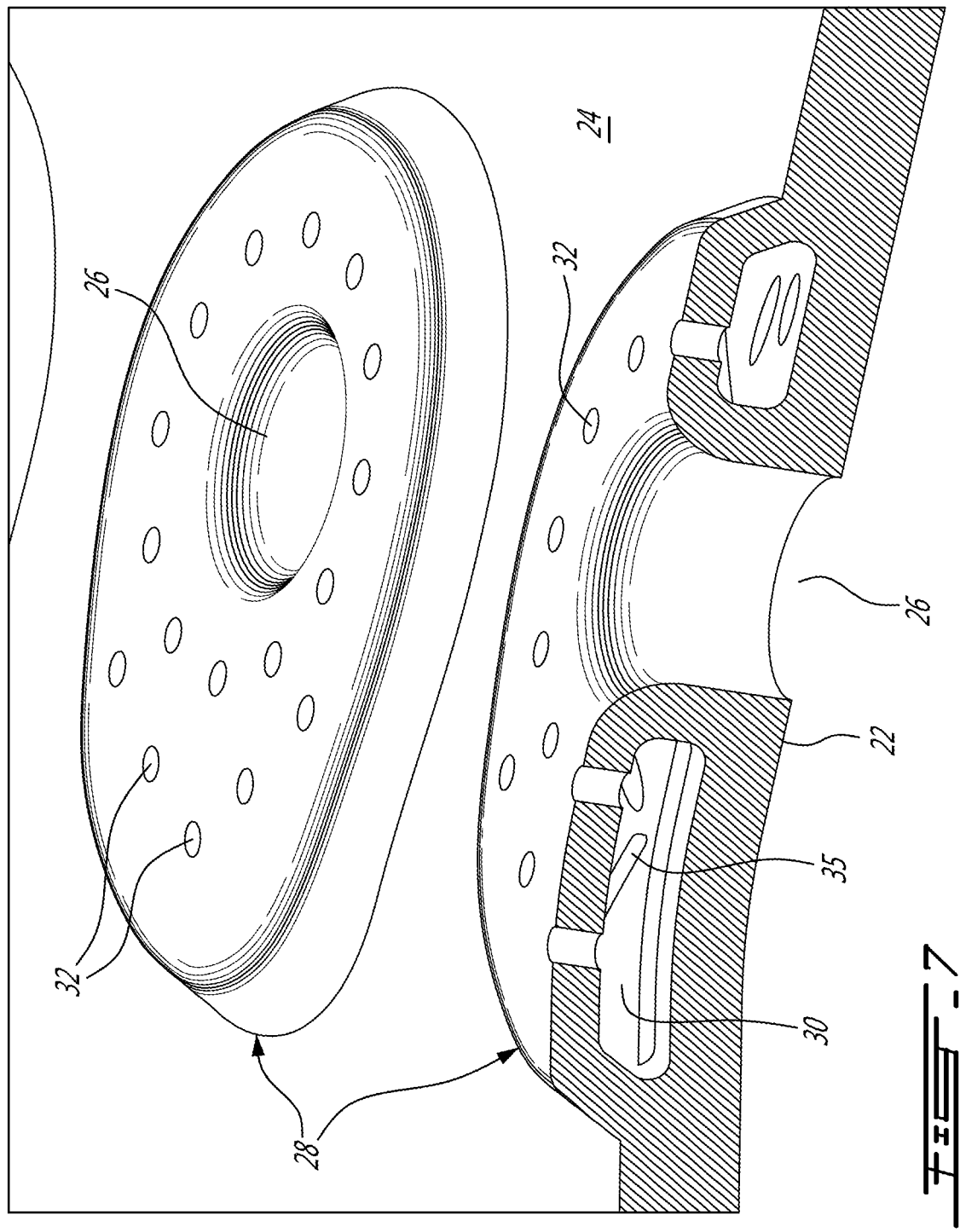

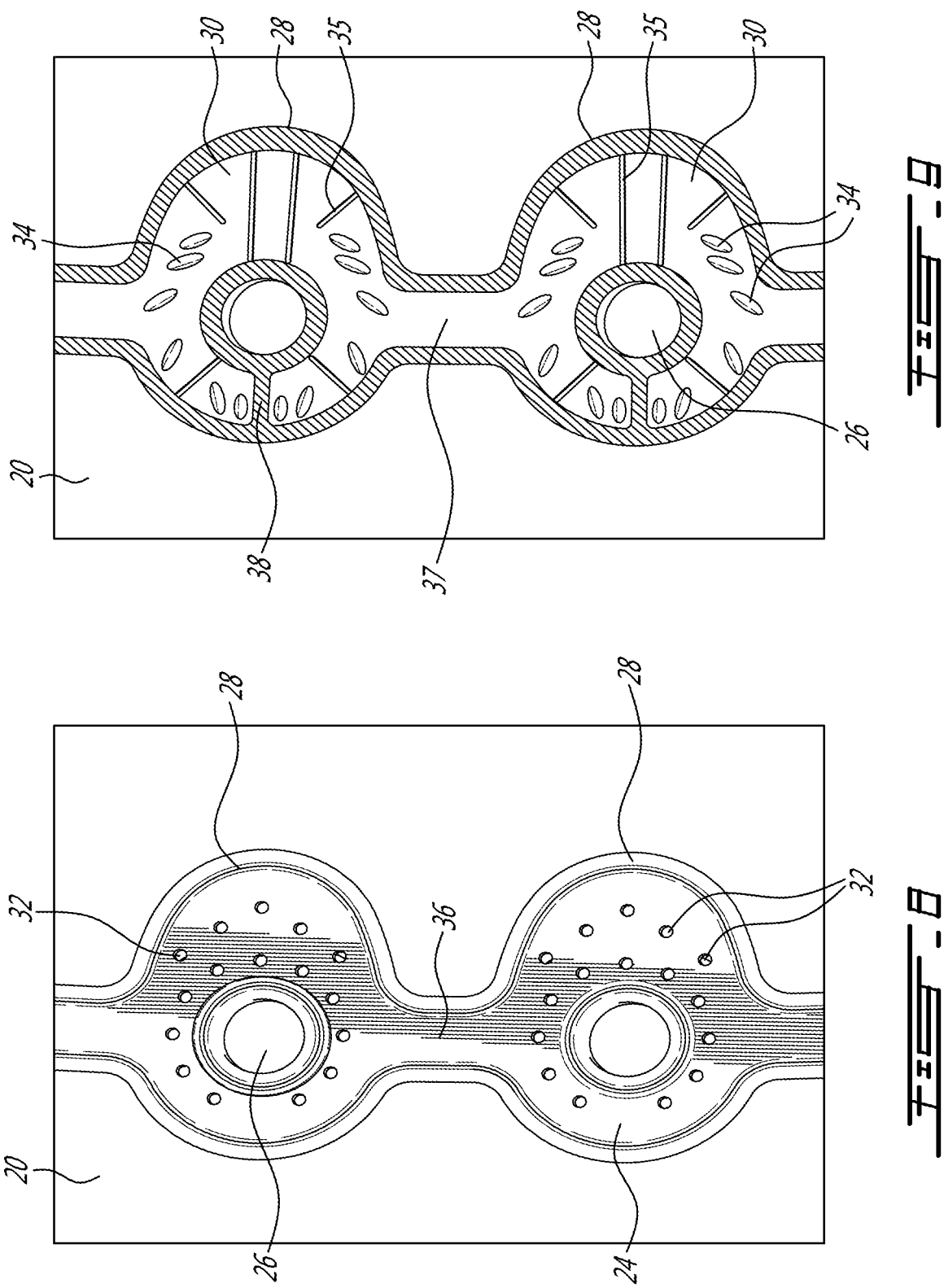

INTERNALLY COOLED DILUTION HOLE BOSSES FOR GAS TURBINE ENGINE COMBUSTORS

RELATED APPLICATIONS

The present application is a continuation of U.S. patent application Ser. No. 14/843,197 filed on Sep. 2, 2015, the content of which is incorporated herein by reference.

TECHNICAL FIELD

The application relates generally to gas turbine engines and, more particularly, to cooling around combustor dilution holes.

BACKGROUND OF THE ART

Combustor dilution holes create strong jets of air that drives specific characteristics of the burning gasses within the combustion chamber. These jets generate large recirculation zones and wakes on the hot surface of the surrounding combustor liner. This makes the region both hotter and more difficult to cool. Residual cooling film from upstream regions, if any, is easily blown away once it nears these features. Additional cooling air would help keep metal temperatures in design range. On the other hand, too much cooling air exhausted around these jets can interfere with the combustion process which is also undesirable. Due to limited space between holes and often awkward geometry, some regions cannot channel sufficient air. High metal temperatures around these dilution holes cause significant oxidation and/or cracking; leading to poor quality jets which eventually lead to performance changes within the combustor.

SUMMARY

Therefore, in accordance with one aspect, there is provided a combustor for a gas turbine engine, the combustor comprising a liner defining a combustion chamber, the liner having an inner surface facing the combustion chamber and an outer surface opposite the inner surface, a set of dilution holes extending through the liner, and a corresponding set of hollow bosses integral to the liner and extending about respective ones of the dilution holes, each hollow boss defining an internal cavity extending about the associated dilution hole, each hollow boss having an inlet defined in the outer surface of the liner for admitting cooling air into the internal cavity and an outlet extending through the inner surface of the liner for discharging the cooling air from the internal cavity into the combustion chamber.

In accordance with another general aspect, there is provided a cooling arrangement for providing cooling around a dilution hole defined in a liner circumscribing a combustion chamber of a gas turbine engine, the cooling arrangement comprising: a hollow boss projecting from an outer surface of the liner about the dilution hole, the hollow boss defining an internal cavity extending circumferentially around the dilution hole, the internal cavity having an inlet in fluid flow communication with an air plenum surrounding the liner and an outlet in fluid flow communication with the combustion chamber.

In accordance with a still further general aspect, there is provided a combustor for a gas turbine engine, the combustor comprising a liner defining a combustion chamber, the liner having an inner surface facing the combustion chamber and an outer surface opposite the inner surface, a dilution hole extending through the liner, a boss integrally formed in the liner about the dilution hole, the boss defining an internal cavity in the liner around the dilution hole, a set of inlet holes defined in the outer surface of the liner for admitting cooling air into the internal cavity, and a set of outlet holes defined in the inner surface of the liner for discharging the cooling air from the internal cavity into the combustion chamber.

DESCRIPTION OF THE DRAWINGS

Reference is now made to the accompanying figures in which:

FIG. 5 is a cold outer side view of a boss which has been widened in one direction to cool a larger surface area around the dilution hole;

FIG. 6 is a section view of the hollow boss shown in FIG. 5 illustrating film holes and trip-trips in the boss cavity;

FIG. 7 is an isometric cross-section view of a boss sectioned axially to show trip-strips in the boss cavity on the underside of the combustor liner;

FIG. 8 is a cold outer side view of bosses which have been connected to each other; and FIG. 9 is a section view of the hollow bosses shown in FIG. 8 illustrating internal cavities which have been connected to each other. Also shown is an internal cavity which does not completely surround a dilution hole.

DETAILED DESCRIPTION

Figure 1:
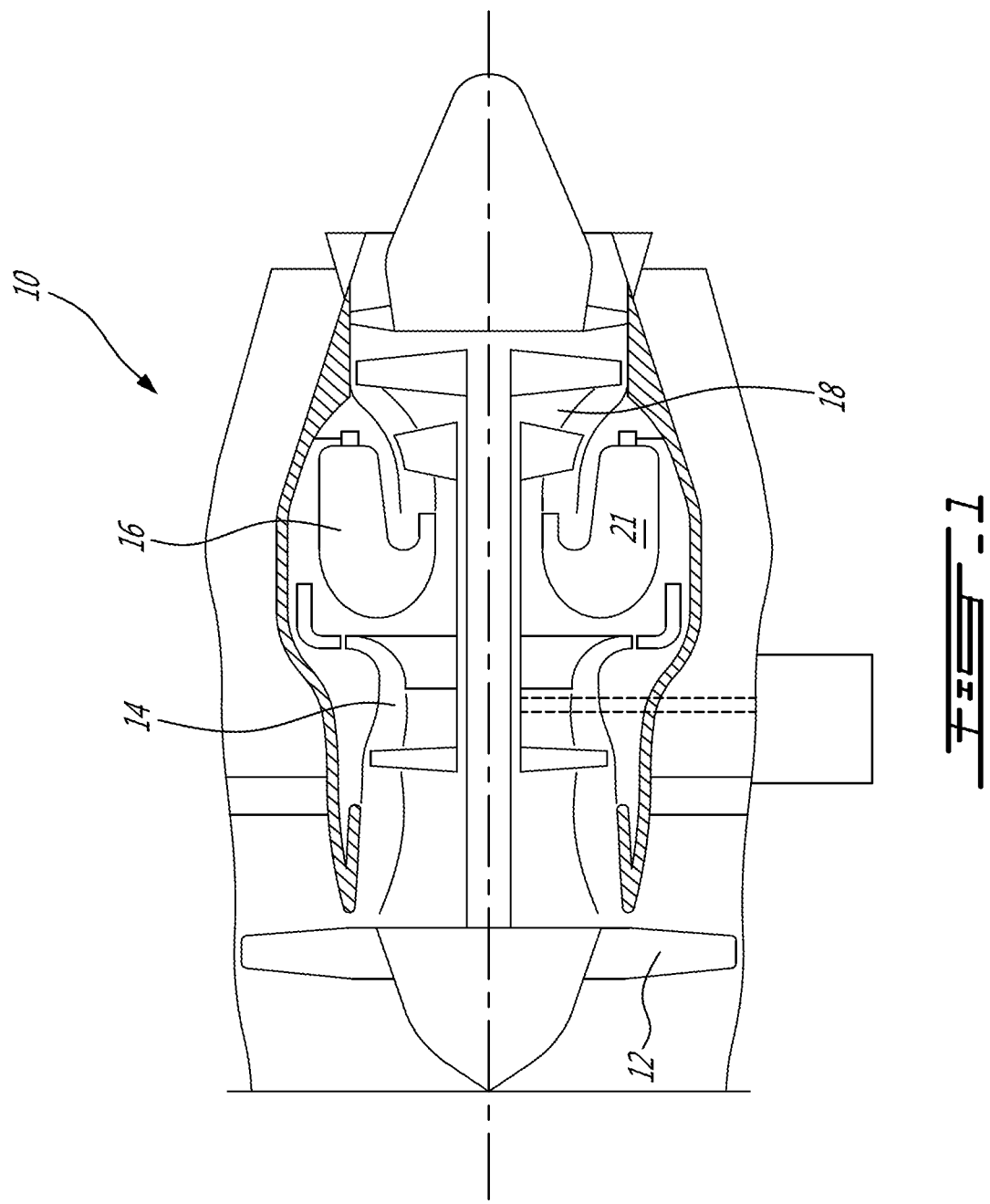
FIG. 1 is a schematic cross-section view of a gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The combustor 16 is housed in a plenum 17 supplied with compressed air from compressor 14. The combustor 16 comprises a liner 20 defining a combustion chamber 21. The liner 20 has a hot inner surface 22 facing the combustion chamber 21 and a back surface or cold outer surface 24 facing the plenum 17. The combustor liner 20 typically includes one or more rows of apertures, known as dilution holes 26, which allow a portion of the air from the plenum 17 to enter the combustion chamber 21 and mix with burning gases. The dilution holes 26 are not to be confused with the cooling holes (not shown) extending through the liner for cooling the same. The dilution holes 26 are used to introduce dilution air into the combustion zone of the combustor. The dilution air quenches the flames so as to control the gas temperature to which the turbine hardware downstream of the combustor will be exposed. The quenching also reduces the level of NOx emissions in the engine exhaust. The dilution holes 26 are generally far smaller in number than the cooling holes, and each dilution hole 26 has a cross-sectional area that is substantially greater than the cross-sectional area of one of the cooling holes. The dilution holes 26 are typically arranged in a circumferentially extending row. As mentioned hereinbefore, the dilution holes 26 create strong jets of air that drives specific characteristics of the burning gasses within the combustion chamber 21. The dilution air generates large recirculation zones and wakes on the inner surface 22 of the liner 20. This makes the region around the dilution holes 26 more difficult to cool.

Figure 2:
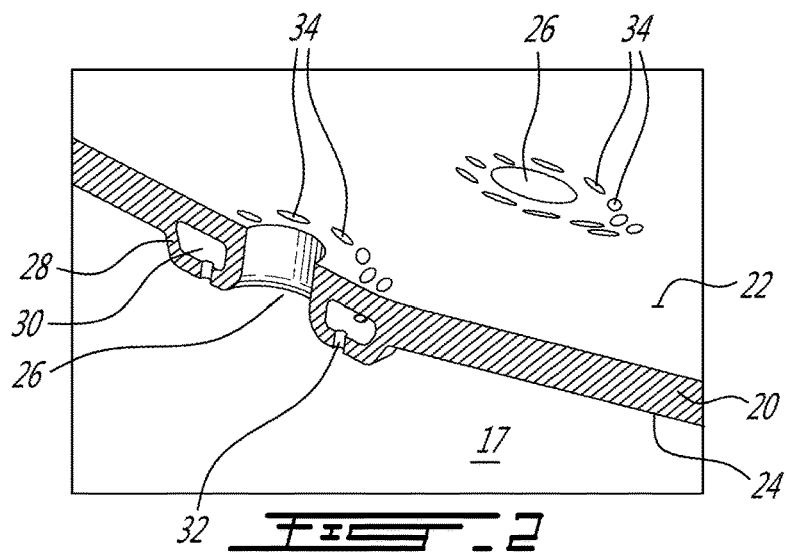
FIG. 2 is an isometric cross-section view of a portion of a combustor liner illustrating bosses integrally formed in the combustor liner about respective dilution holes, each boss defining an internal cavity for receiving cooling air from a plurality of inlet holes on a cold side of the combustor, outlet holes being provided on the hot side of the combustor for discharging the cooling air from the internal cavity of the bosses.

As shown in FIG. 2, a hollow boss 28 that incorporates internal passages with cooling air may be integrally formed in the liner 20 about each individual dilution hole 26 to maximize heat removal about the dilution holes 26.

Figure 3:
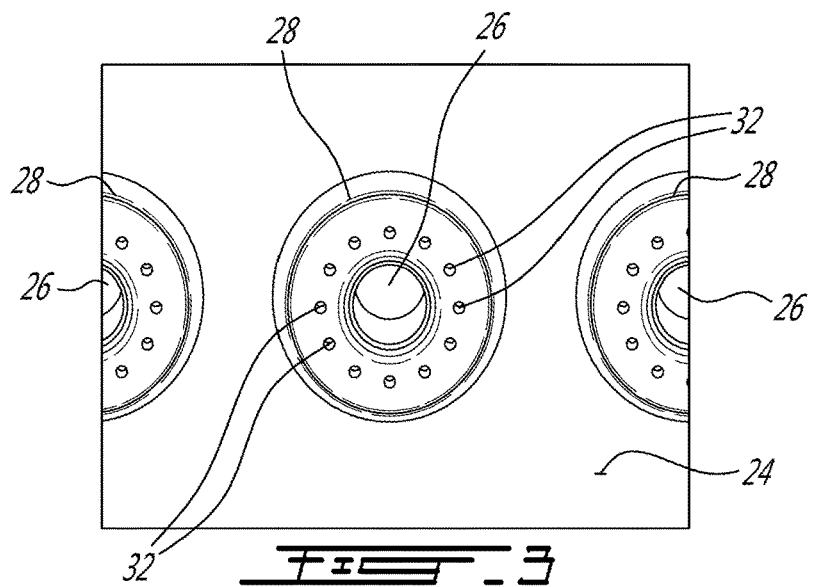
FIG. 3 is a cold outer side view of the bosses shown in FIG. 2.
Figure 4:
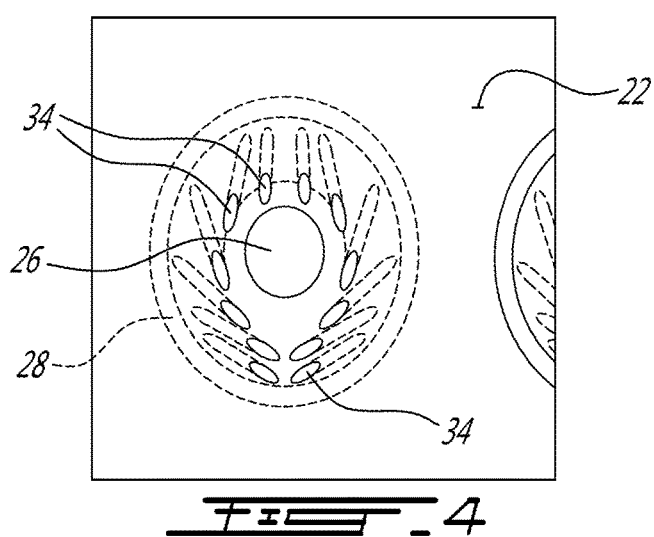
FIG. 4 is a hot inner side view illustrating a boss internal cavity and the outlet holes thereof.

More particularly, according to the embodiment shown in FIGS. 2 to 4, each boss 28 integrally projects from the outer surface 24 of the liner 20 about a corresponding one of the dilution holes 26. In the illustrated embodiment, each boss 28 has a low profile donut shape. However, it is understood that the bosses 28 could adopt other suitable configurations. Each boss 28 defines an internal cavity 30 around the associated dilution hole 26. According to the illustrated embodiment, the internal cavity 30 is provided in the form of an annulus with an oblong cross-section. It is understood that the internal cavity 30 may be even more widened in any desired direction away from the dilution hole 26 to provide cooling over a larger surface area. Notably, the boss and its internal cavity can be widened in a downstream direction relative to the combustion gases flowing through the combustor. This can for instance be appreciated from FIGS. 5 and 6. The internal cavity 30 extends circumferentially continuously about the dilution hole 26. From FIGS. 2 to 4, it can be appreciated that each internal cavity 30 encircles the associated dilution hole 26.

Each internal cavity 30 has an inlet for allowing cooling air in the plenum 17 to flow therein. For instance, a circular array of uniformly distributed inlet holes 32 may be defined atop of each boss 28. The distribution of the inlet holes 32 may however vary over the outer surface area of the boss as for instance shown in FIG. 5. Each internal cavity 30 also has an outlet for discharging the spent cooling air into the combustion chamber 21. For instance, a set of outlet holes 34 may extend from the internal cavity 30 through the inner surface 22 of the liner 20 to the combustion chamber 21 around each dilution holes 26. Each set of outlet holes 34 is in fluid flow communication with a corresponding one of the boss internal cavity 30 for discharging the cooling air circulated therethrough into the combustion chamber 21.

According to the illustrated embodiment, the inlet holes 32 are provided in the form of impingement holes oriented to direct impingement jets against the back surface (i.e. the cold outer surface 24) of the liner 20 within the boss internal cavities 30. Heat transfer augmentation features 35 (FIGS. 6, 7 and 9), such as trip-strips or pin-fins, could be provided on the back surface of the liner 20 within each boss internal cavity 30.

The outlet holes 34 may be provided in the form of film holes for forming a cooling film on the inner surface 22 of the combustor liner 20. The film holes do not have to be straight—they can be curved to form longer cooling passages, and their exits can be located further downstream.

In operation, cooling air from the plenum 17 enters the inlet holes 32 from the cold outer surface 24 of the liner 20. The air flowing through the inlet holes 32 impinges against the back side of the liner within the boss internal cavities 30. Then, the cooling air follows a curved or shaped passage (i.e. internal cavity 30) around each dilution hole rim in the liner 20 before exiting into the combustion chamber 21 via outlet holes 34. The cooling air passing through the outlet holes 34 provides for the formation of a cooling film on the inner surface 22 of the liner 20. The curved or annular shape of the internal cavity 30 conforms to the boss 28, enabling a more even temperature distribution. This provides for increase cooling effectiveness around the combustor dilution holes 26 and, thus, better durability of the combustor liner 20. This is particularly true for single skin combustors.

As shown in FIGS. 8 and 9, one or more bosses 28 may be connected by a bridge 36. This allows internal cavities 30 to be connected to each other by a connector 37. This configuration is advantageous when the dilution holes 26 are closely spaced. Also shown in FIG. 9 is a wall 38. This illustrates that the internal cavity 30 does not have to completely encircle the dilution hole.

It is understood that other technologies, such as rifled holes, worm holes or internal impingement, can be combined to make the cooling even more effective. Also, the internal cavities 30 could be made wider to cover a larger surface area around the dilution holes 26 (FIGS. 5 and 6). The bosses 28 could be locally thickened to incorporate other cooling features, such as impingement, pin fin, trip strip and any other suitable heat transfer augmentation features (FIGS. 6 and 7).

The above description is meant to be exemplary only, and one skilled in the art will recognize that changes may be made to the embodiments described without departing from the scope of the invention disclosed. Any modifications which fall within the scope of the present invention will be apparent to those skilled in the art, in light of a review of this disclosure, and such modifications are intended to fall within the appended claims.

The invention claimed is:

1. A combustor for a gas turbine engine, the combustor comprising:
   a liner defining a combustion chamber, the liner having:
      an inner surface facing the combustion chamber and an outer surface opposite the inner surface,
      a set of dilution holes extending through the liner, and
      a set of hollow bosses formed integrally on the outer surface of the liner, wherein the set of hollow bosses comprises a corresponding hollow boss extending about a corresponding dilution hole of the set of dilution holes, such that each hollow boss corresponds to each dilution hole of the set of dilution holes, each corresponding hollow boss defining an internal cavity extending about each corresponding dilution hole, each hollow boss having an inlet defined in the outer surface of the liner for admitting cooling air into the internal cavity and a plurality of film holes extending through the inner surface of the liner and fluidly connecting the internal cavity to the combustion chamber, the film holes being angled relative to the liner and distributed in a circle pattern about the corresponding dilution hole for forming a cooling film on the inner surface of liner, wherein heat transfer augmentation features are provided on an internal cavity surface of at least one of the hollow bosses of the set of hollow bosses, the heat transfer augmentation features interspersed between the film holes.

2. The combustor defined in claim 1, wherein the internal cavity of each hollow boss at least partly encircles each corresponding dilution hole and is sealed therefrom.

3. The combustor defined in claim 1, wherein the internal cavity of each hollow boss is provided in the form of an annulus which is widened in a direction away from each corresponding dilution hole.

4. The combustor defined in claim 1, wherein the inlet comprises a set of impingement holes distributed atop of the set of hollow bosses.

5. A combustor for a gas turbine engine, the combustor comprising:
- a liner defining a combustion chamber, the liner having:
  - an inner surface facing the combustion chamber and an outer surface opposite the inner surface,
  - a dilution hole extending through the liner,
  - a boss integrally formed in the liner about the dilution hole, the boss defining an internal cavity in the liner around the dilution hole, the internal cavity extending over a surface area of the liner around the dilution hole,
  - a set of inlet holes defined in the outer surface of the liner for admitting cooling air into the internal cavity, and
  - a set of film holes defined in the inner surface of the liner for discharging the cooling air from the internal cavity into the combustion chamber, the set of film holes being distributed over the surface area of the liner covered by the internal cavity,
  - wherein heat transfer augmentation features are provided on an internal cavity surface of the boss, and wherein the heat transfer augmentation features are interspersed between the film holes.

6. The combustor defined in claim 5, wherein the internal cavity is provided in the form of an annulus widened in a direction away from the dilution hole.

7. A cooling arrangement for providing cooling around a dilution hole defined in a liner circumscribing a combustion chamber of a gas turbine engine, the cooling arrangement comprising: a hollow boss projecting from an outer surface of the liner about the dilution hole, the hollow boss defining an internal cavity extending circumferentially around the dilution hole, the internal cavity being sealed from the dilution hole defined in the liner, the internal cavity having an inlet in fluid flow communication with an air plenum surrounding the liner and a plurality of film holes distributed in circular pattern about the dilution hole and angled with respect to the liner to promote the formation of coolant film on an inner surface of the liner, and wherein heat transfer augmenters project from an internal cavity surface of the hollow boss, the heat transfer augmenters interspersed between the film holes.

8. The cooling arrangement defined in claim 7, wherein the inlet comprises a set of impingement holes defined in the hollow boss and oriented to direct impingement jets directly against the internal cavity surface from which the heat transfer augmenters project into the internal cavity.

\* \* \* \* \*